United States Patent
Engler et al.

[19]

[11] Patent Number: 6,119,550
[45] Date of Patent: Sep. 19, 2000

[54] LINKAGE COMPONENT

[75] Inventors: Leonard W. Engler, Rochester Hills; Brian K. Saylor, Leonard, both of Mich.

[73] Assignee: TRW Inc., Lyndhurst, Ohio

[21] Appl. No.: 09/149,871

[22] Filed: Sep. 8, 1998

[51] Int. Cl.$^7$ ................................ G05G 3/00; F16B 3/00
[52] U.S. Cl. ............................ 74/588; 403/354
[58] Field of Search .................. 74/579 E, 588, 74/586, 587, 579 R; 29/809, 888.092, 888.091; 403/354, 364

[56] References Cited

U.S. PATENT DOCUMENTS

| | | |
|---|---|---|
| 1,380,659 | 6/1921 | Layman .................... 74/588 |
| 1,507,514 | 9/1924 | Petrosky .................. 74/588 |
| 1,824,450 | 9/1931 | Sneed ................... 74/588 X |
| 2,158,838 | 5/1939 | Shakespeare ............... 74/588 |
| 3,709,099 | 1/1973 | Dumeah . |
| 4,887,486 | 12/1989 | Wood, Jr. . |
| 5,080,520 | 1/1992 | Wood, Jr. . |
| 5,306,095 | 4/1994 | Snitgen et al. ............ 403/354 X |
| 5,429,447 | 7/1995 | Wood . |
| 5,570,880 | 11/1996 | Nordgran ................. 403/364 X |
| 5,603,583 | 2/1997 | Jackson . |
| 5,787,763 | 8/1998 | Fatehpour et al. ........... 74/588 X |

*Primary Examiner*—David A. Bucci
*Assistant Examiner*—Marcus Charles
*Attorney, Agent, or Firm*—Tarolli, Sundheim, Covell, Tummino & Szabo L.L.P.

[57] ABSTRACT

A linkage component (22) for a vehicle includes a rod portion (60) which extends between opposite end portions (56 and 58) which are connected with the vehicle. The rod portion (60) of the linkage component (22) has a seam (64) which is held in a closed condition by interlocking projections (72) and recesses (78). The linkage component (22) is formed from a single piece of sheet metal.

6 Claims, 4 Drawing Sheets

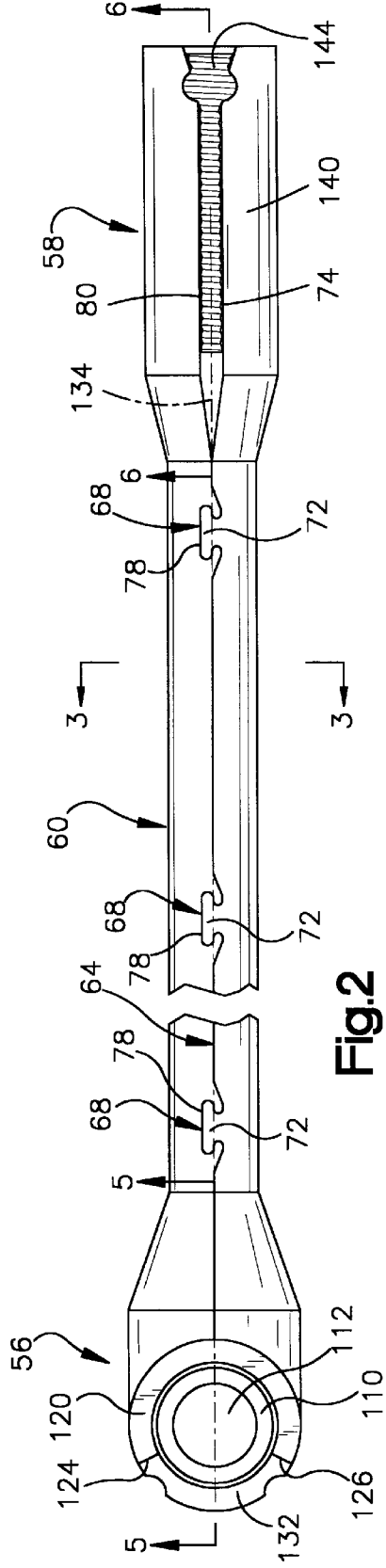
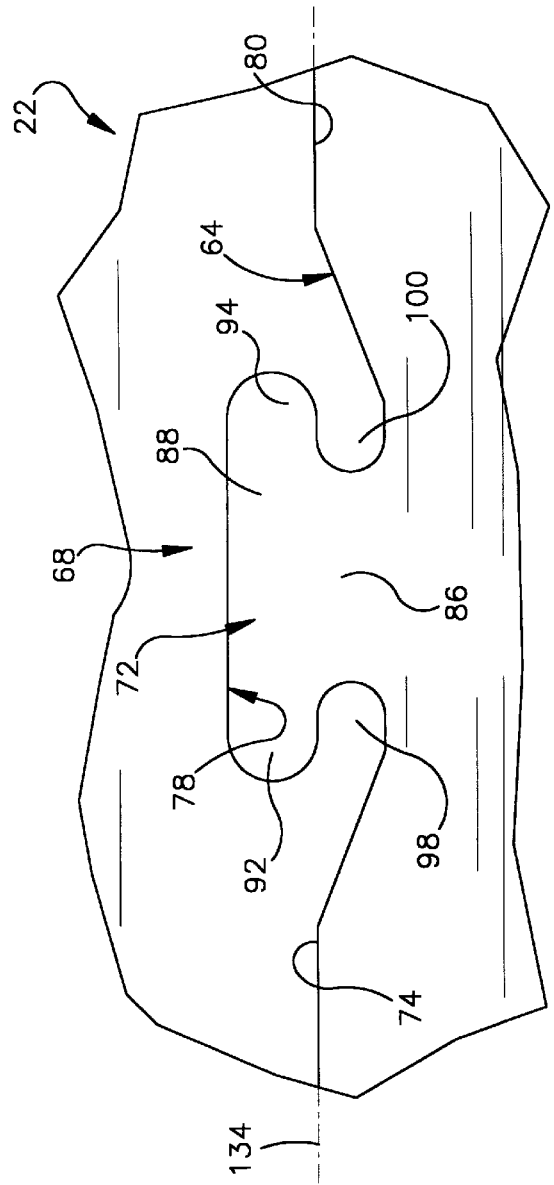

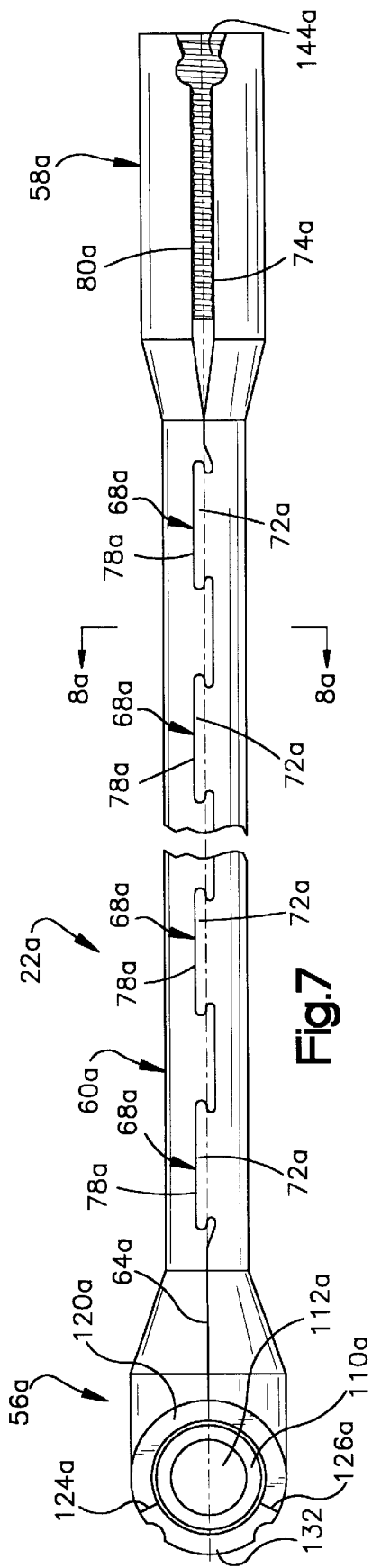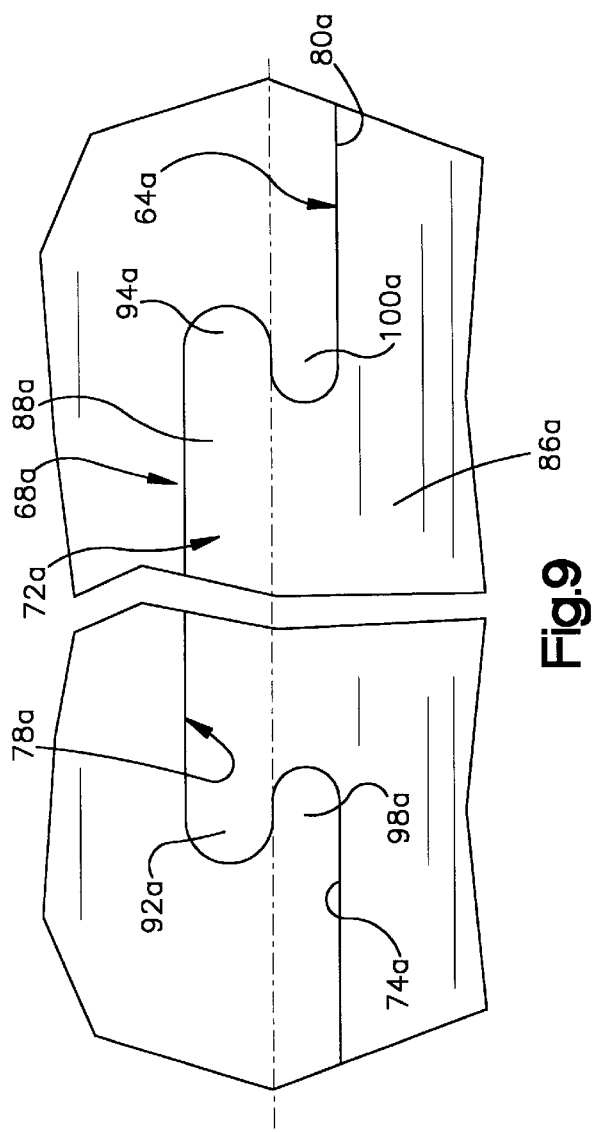

LINKAGE COMPONENT

BACKGROUND OF THE INVENTION

The present invention relates to a linkage component and more specifically to a linkage component which is formed of sheet metal and has interlocking projections and recesses to prevent expansion of a seam in the linkage component.

Linkage components have previously been utilized in vehicles to transmit force between various portions of the vehicle. For example, linkage components have been utilized in association with center take-off rack and pinion power steering gear systems such as disclosed in U.S. Pat. No. 3,709,099. In this specific example, the linkage component transmits force from the rack and pinion power steering gear to steerable vehicle wheels. However, it should be understood that linkage components have been utilized at many different locations in many different types of vehicles.

SUMMARY OF THE INVENTION

The present invention relates to a new and improved linkage component for use in a vehicle. The linkage component has a rod portion which extends between opposite end portions. The end portions of the linkage component are connectable with the vehicle. The rod portion is formed of sheet metal. The end portions and the rod portion of the linkage component may advantageously be formed from a single piece of sheet metal.

The rod portion of the linkage component includes a seam which extends between the end portions of the linkage component. The seam is at least partially formed by interlocking projections and recesses. The interlocking projections and recesses prevent expansion of the seam during the application of force to the linkage component.

BRIEF DESCRIPTION OF THE DRAWINGS

The foregoing and other features of the present invention will become more apparent to one skilled in the art upon a consideration of the following description taken in connection with the accompanying drawings wherein:

FIG. 2 is an enlarge fragmentary plan view, taken generally along the line 2—2 of FIG. 1, further illustrating the construction of one of the linkage components connected with the rack and pinion power steering gear;

FIG. 3 is an enlarged sectional view, taken generally along the line 3—3 of FIG. 2, further illustrating the construction of the linkage component;

FIG. 4 is an enlarged fragmentary view of a portion of FIG. 2 and illustrating the manner in which a seam in the linkage component is retained against expansion by interlocking projections and recesses;

FIG. 7 is a plan view, generally similar to FIG. 2, illustrating another embodiment of the linkage component;

FIG. 8 is a sectional view taken generally along the line 8—8 of FIG. 7, further illustrating the construction of the linkage component of FIG. 7; and FIG. 9 is an enlarged fragmentary view illustrating the manner in which interlocking projections and recesses prevent expansion of a seam in the linkage component of FIG. 7.

DESCRIPTION OF SPECIFIC PREFERRED EMBODIMENTS OF THE INVENTION

Figure 1:
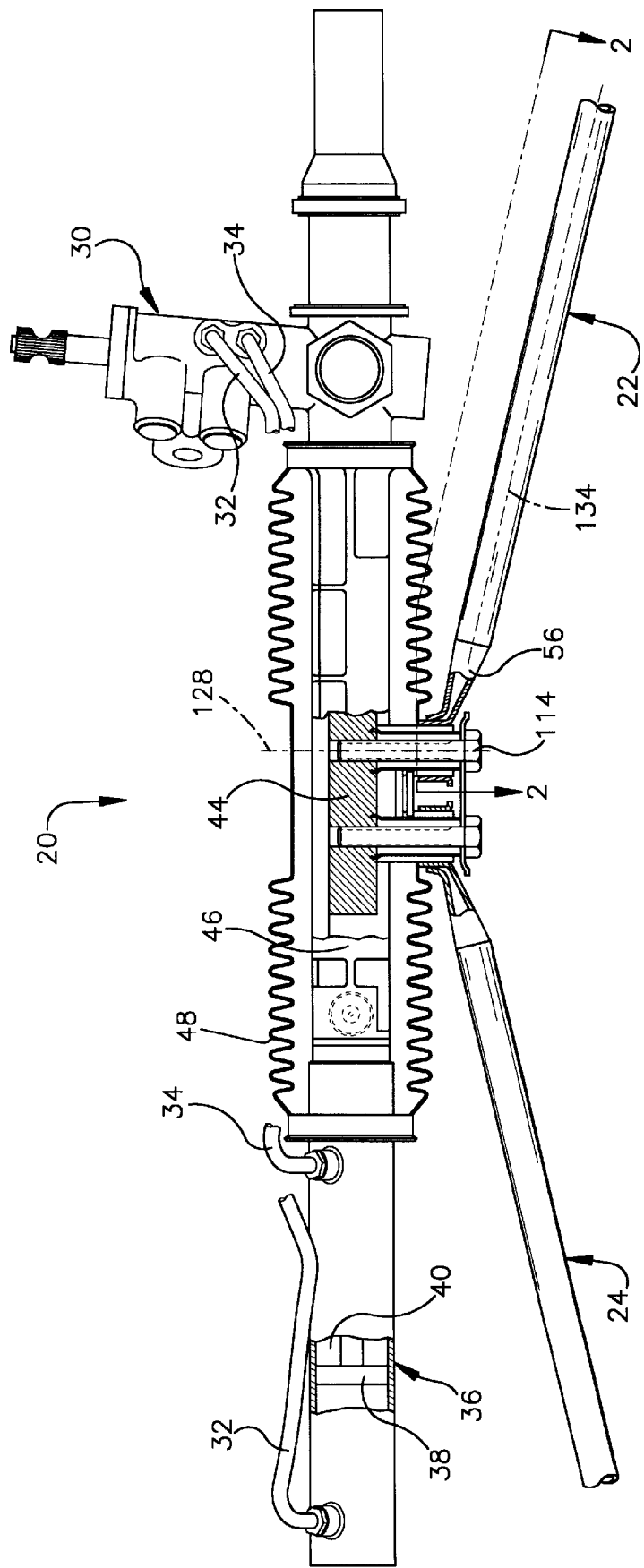
FIG. 1 is an illustration depicting the manner in which a pair of linkage components are connected with a known rack and pinion power steering gear.

A known rack and pinion power steering gear 20 is illustrated in FIG. 1. The rack and pinion power steering gear 20 is connected with steerable vehicle wheels (not shown) by linkage components or tie rods 22 and 24. During operation of the rack and pinion power steering gear 20, the linkage components 22 and 24 transmit force to the steerable vehicle wheels to turn the wheels in a known manner.

The rack and pinion power steering gear 20 includes a valve assembly 30 which directs high pressure fluid through conduits 32 and 34 connected with opposite end portions of a hydraulic motor 36. The hydraulic motor 36 includes a piston 38 which is moved in a cylinder 40 under the influence of hydraulic fluid conducted to the cylinder from the valve assembly 30.

A rack bar 44 is enclosed by a housing 46 and a flexible boot 48. The left (as viewed in FIG. 1) end portion of the rack bar 44 is connected with the piston 38 in the hydraulic motor 36. The right (as viewed in FIG. 1) end portion of the rack bar 44 is provided with rack teeth which are engaged by a pinion (not shown). The general construction and mode of operation of the rack and pinion power steering gear 20 is the same as is disclosed in U.S. Pat. No. 3,709,099.

Linkage Component

The linkage component 22 is constructed in accordance with the present invention and is illustrated in FIG. 2. The linkage component 22 includes an end portion 56 (FIGS. 2 and 5) which is connected with the rack and pinion power steering gear 20 (FIG. 1). The opposite end portion 58 (FIGS. 2 and 6) of the linkage component 22 is connected with a steerable vehicle wheel (not shown). The two end portions 56 and 58 of the linkage component 22 are interconnected by a cylindrical rod portion 60 (FIGS. 2 and 3).

The linkage component 22 (FIG. 2) is advantageously formed from a single piece of sheet metal, that is, steel. Thus, the two end portions 56 and 58 and rod portion 60 of the linkage component 22 are integrally formed from a single piece of sheet metal. A seam 64 (FIGS. 2 and 3) extends between the opposite end portions 56 and 58 of the linkage component 22.

In accordance with a feature of the present invention, interlocks 68 (FIGS. 2 and 4) hold the seam 64 against expansion under the influence of forces applied to the linkage component 22 during operation of the vehicle. The identical interlocks 68 are formed in the cylindrical rod portion 60 of the linkage component 22. The interlocks 68 are formed by projections 72 formed in one side 74 of the seam 64 and recesses 78 formed in an opposite side 80 of the seam 64. The interlocking projections 72 and recesses 78 (FIG. 4) hold the seam 64 closed even though torsional operating forces applied to the linkage component 22 may tend to expand the seam.

The projection 72 has a generally T-shaped configuration. The projection 72 has a base 86 (FIG. 4) which is formed in the side 74 of the seam 64. A head end portion 88 extends from the base 86. The head end portion 88 has flanges 92 and 94 which extend in opposite directions from the base 86 of the projection 72.

The side 80 of the seam 64 is provided with a recess 78 which receives the projection 72. The recess 78 has a generally T-shaped configuration corresponding to the shape of the projection 72. A pair of retainer sections 98 and 100 of the sheet metal disposed on the side 80 of the seam 64, extend beneath (as viewed in FIG. 4) the flanges 92 and 94. The retainer sections 98 and 100 engage the flanges 92 and 94 on the head end portion 88 of the projection 72 to form an interlock with the projection.

The interlocks 68 are effective to block expansion of the seam 64 in the linkage component 22 under the influence of forces applied to the linkage component during operation of the vehicle. This enables the linkage component 22 to be free of welds interconnecting sheet metal on opposite sides of the seam 64. The interlocks 68 mechanically interconnect the opposite sides 74 and 80 of the seam 64 to prevent expansion of the seam without any welds. The interlocks 68 enable the linkage component 22 to be made from a light weight piece of sheet metal which is relatively strong due to the complete absence of welds in the linkage component 22.

In accordance with another feature of the present invention, the end portion 56 (FIG. 2) of the linkage component 22 is integrally formed as one piece with the rod portion 60 of the linkage component. By forming the rod portion 60 and end portion 56 of the linkage component from a single piece of sheet metal, the weight of the linkage component 22 can be minimized while the strength of the linkage component is maximized.

The end portion 56 (FIG. 5) of the linkage component 22 has a cylindrical side wall 110. The side wall 110 defines a cylindrical passage 112 which extends through the end portion 56 of the linkage component 22. The passage 112 receives a fastener 114 (FIG. 1) to connect the end portion 56 of the linkage component 22 with the rack and pinion power steering gear 20.

Figure 5:
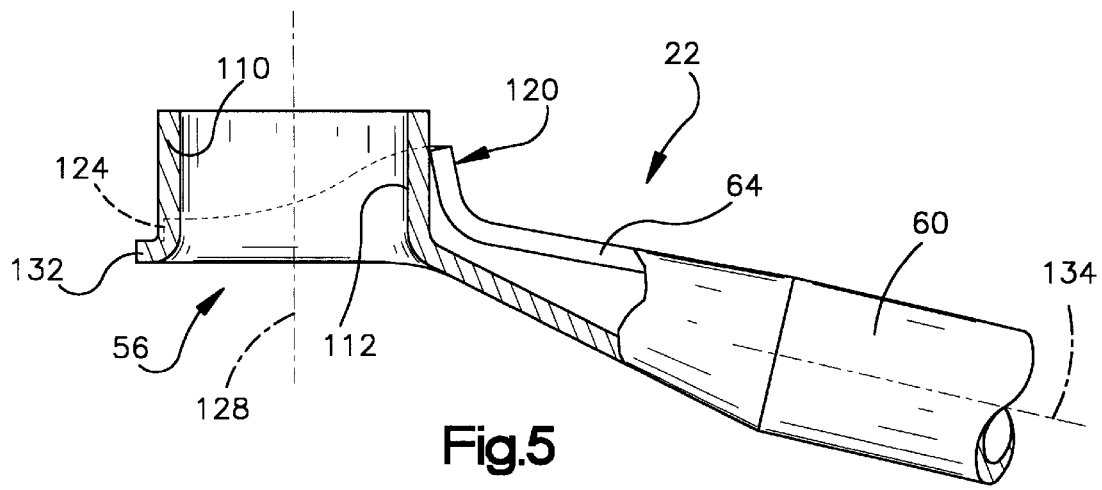
FIG. 5 is a fragmentary sectional view, taken generally along the line 5—5 of FIG. 2, further illustrating the construction of an end portion of the linkage component which is connected with the rack and pinion power steering gear of FIG. 1.
Figure 6:
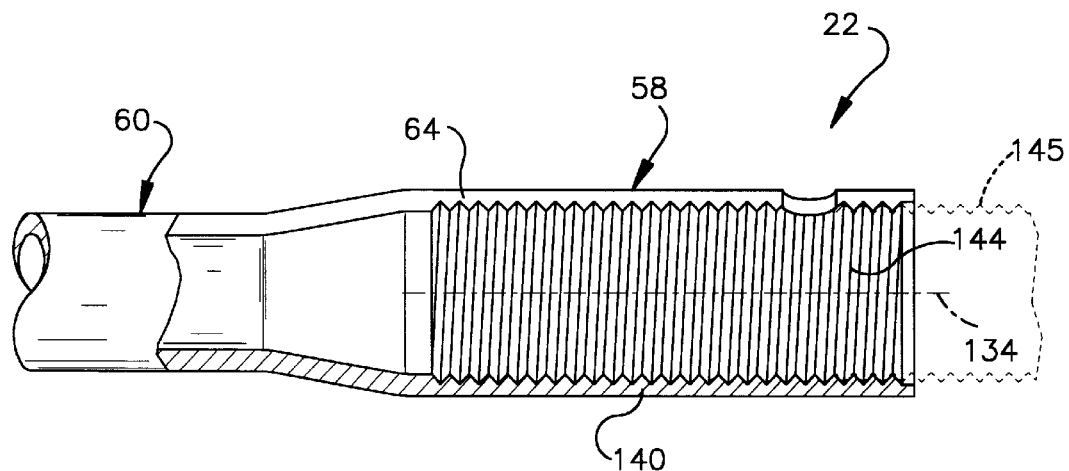
FIG. 6 is a fragmentary sectional view, taken generally along the line 6—6, illustrating the construction of an end portion of the linkage component which is connected with steerable vehicle wheels.

In addition to the cylindrical side wall 110 (FIG. 5), the end portion 56 of the linkage component 22 includes a collar 120 which extends part way around the cylindrical side wall 110 (FIGS. 2 and 5). The collar 120 is provided with a pair of stop or locating surfaces 124 and 126 (FIG. 2) which engage surfaces on the rack and pinion power steering gear 20 (FIG. 1). The stop surfaces 124 and 126 limit pivotal movement of the linkage component 22 about a central axis 128 (FIG. 5) of the passage 112 and side wall 110.

A flange 132 (FIGS. 2 and 5) extends outward from the cylindrical side wall 110 to strengthen the cylindrical side wall. The flange 132, collar 120, and cylindrical side wall 110 are formed from the same piece of sheet metal as the rod portion 60 of the linkage component 22. The flange 132, collar 120 and side wall 110 cooperate to stiffen the end portion 56 of the linkage component 22.

The passage 112 and cylindrical side wall 110 (FIG. 5) have a common central axis 128 (FIG. 5). The axis 128 extends transverse to a longitudinal central axis 134 (FIGS. 1 and 2) of the rod portion 60 of the linkage component 22. The central axis 128 of the passage 112 intersects the longitudinal central axis 134 of the rod portion 60. However, the central axis 128 of the passage 112 does not extend perpendicular to the central axis of the rod portion 60. Thus, the central axis 128 of the passage 112 is skewed slightly relative to the central axis 134 of the rod portion 60 to enable the linkage component 22 to be connected with the rack and pinion power steering gear 20 in the orientation illustrated in FIG. 1.

The end portion 58 (FIGS. 2 and 6) of the linkage component 22 is connected with steerable vehicle wheels. The end portion 58 of the linkage component 22 has a cylindrical side wall 140 which is coaxial with the cylindrical rod portion 60 of the linkage component 22. The side wall 140 on the end portion 58 of the linkage component 22 is formed from the same piece of sheet metal as the rod portion 60 and opposite end portion 56 of the linkage component 22. The cylindrical side wall 140 of the end portion 58 of the linkage component 22 has a longitudinal central axis which is coincident with the longitudinal central axis 134 of the cylindrical rod portion 60 of the linkage component 22.

Although the cylindrical side wall 140 of the end portion 58 of the linkage component 22 is coaxial with the rod portion 60 of the linkage component 22, the cylindrical side wall 140 has a larger diameter than the rod portion 60. This results in the seam 64 being expanded somewhat in the end portion 58 of the linkage component 22 (FIG. 2).

A helical internal thread convolution 144 (FIGS. 2 and 6) is disposed within the cylindrical side wall 140. The internal thread convolution 144 engages an external thread convolution on a member (illustrated schematically in dashed lines at 145 in FIG. 6) connected with a steerable vehicle wheel. During turning movement of the steerable vehicle wheels, axial forces are transmitted between a steerable vehicle wheel and the rack and pinion power steering gear 20 (FIG. 1) through the internal thread convolution 144 (FIG. 6) in the end portion 58 of the linkage component 22.

Linkage Component—Second Embodiment

In the embodiment of the invention illustrated in FIGS. 2–6, the linkage component 22 has interlocks 68 with a relatively short axial extent. In the embodiment of the invention illustrated in FIGS. 7–9, the interlocks have a relatively long extent along the length of the linkage component 22. Since the embodiment of the invention illustrated in FIGS. 7–9 is generally similar to the embodiment of the invention illustrated in FIGS. 2–6, similar numerals will be utilized to designate similar components, the suffix letter "a" being associated with the numerals of FIGS. 7–9 to avoid confusion.

A linkage component 22*a* (FIG. 7) has an end portion 56*a* which is adapted to be connected with the rack and pinion power steering gear 20 of FIG. 1. An opposite end portion 58*a* (FIG. 7) of the linkage component 22*a* is adapted to be connected with a steerable vehicle wheel (not shown). A cylindrical rod portion 60*a* interconnects the end portions 56*a* and 58*a* of the linkage component 22*a*.

A seam 64*a* (FIGS. 7 and 8) extends between opposite ends of the linkage component 22*a*. The linkage component 22*a* is integrally formed from one piece of stamped sheet metal, that is, steel. The linkage component 22*a* is free of welds. Therefore, the linkage component 22*a* can be formed of relatively thin sheet metal and be relatively light in weight.

In accordance with a feature of this embodiment of the invention, interlocks 68*a* (FIGS. 7 and 9) are provided in the seam 64*a* to prevent expansion of the seam under the influence of forces applied to the linkage component 22*a* during operation of the vehicle. Each of the identical interlocks 68*a* includes a projection 72*a* (FIG. 9) which is disposed on a side 74*a* of the seam 64*a* and extends into a recess 78*a* disposed on the opposite side 80*a* of the seam 64*a*.

The projection 72*a* includes a base 86*a* which extends into the recess 78*a*. The base 86*a* has a longer extent along the longitudinal central axis of the linkage component 22*a* than does the base 86 (FIG. 4) of the projection 72 of the embodiment of the invention illustrated in FIGS. 2–6. A head end portion 88*a* (FIG. 9) is connected with the base 86*a* and extends into the recess 78a. A pair of flanges 92a and 94a extend from opposite ends of the head end portion 88a.

A pair of retainer sections 98a and 100a are formed in the sheet metal on the side 80a of the seam 64a. The retainer sections 98a and 100a extend beneath (as viewed in FIG. 9) the flanges 92a and 94a on the head end portion 88a. The projections 98a and 100a cooperate with the flanges 92a and 94a to block expansion of the seam 64a under the influence of forces applied against the linkage component 22a during turning of steerable vehicle wheels in the manner previously explained in conjunction with the embodiment of the invention shown in FIGS. 2–6.

The end portions 56a and 58a of the steering linkage component 22a have the same configuration as the end portions 56 and 58 of the linkage component 22 of FIG. 2. Thus, the steering linkage component 22a (FIG. 7) has an end portion 56a with a cylindrical side wall 110a. The cylindrical side wall 110a defines a passage 112a which extends through the end portion 56a. A collar 120 extends part way around the cylindrical side wall 110a. Stop surfaces 124a and 126a are provided on the collar 120a. A flange 132a extends outward from the side wall 110a to reinforce the side wall.

The opposite end 58a (FIG. 7) of the linkage component 22a is expanded and has a larger diameter than the rod portion 60a of the linkage component 22a. The end portion 58a of the linkage component 22a has an internal thread convolution 144a which engages an external thread convolution on a member connected with a steerable vehicle wheel. Since the end portion 58a of the linkage component 22a is expanded, relative to the rod portion 60a, the seam 64a is slightly open in the end portion 58a of the linkage component 22a.

From the above description of the invention, those skilled in the art will perceive improvements, changes and modifications. Such improvements, changes and modifications within the skill of the art are intended to be covered by the appended claims.

What is claimed is:

1. A linkage component for use in a vehicle, said linkage component comprising:

a first end portion for connection with a first portion of the vehicle;

a second end portion for connection with a second portion of the vehicle; and a rod portion formed of sheet metal and extending between said first and second end portions of said linkage component, said rod portion includes a seam which extends between said first and second end portions of said linkage component, said seam being at least partially formed by interlocking projections and recesses, said projections being formed in sheet metal disposed on a first side of said seam and said recesses being formed in sheet metal disposed on a second side of said seam, said projection has a base formed in sheet metal on the first side of said seam and which extends into a recess formed in sheet metal on the second side of the seam and a head end portion formed in sheet metal on the first side of said seam and which extends from opposite sides of said base along a longitudinal central axis of said rod portion of said linkage component.

2. A linkage component as set forth in claim 1 wherein said sheet metal on the second side of the seam includes a first retainer section which is disposed between a first flange on said head portion and the sheet metal on the first side of the seam and a second retainer section which is disposed between a second flange on said head portion and the sheet metal on the first side of the seam, said first and second retainer sections being engaged by said first and second flanges on said head portion to block expansion of the seam upon application of force to said linkage component during operation of the vehicle.

3. A linkage component as set forth in claim 1 wherein said first and second end portions and said rod portion of said linkage component are formed by a single piece of sheet metal.

4. A linkage component as set forth in claim 1 wherein said rod portion is free of welds.

5. A linkage component as set forth in claim 1 wherein said first end portion of said linkage component and said rod portion of said linkage component are formed from a single piece of sheet metal, said first end portion of said linkage component includes a cylindrical wall having a central axis which extends transverse to a longitudinal central axis of said rod portion of said linkage component, said cylindrical wall having an inner side surface which at least partially defines a passage through which a fastener extends to connect the first end portion of said linkage component with the first portion of the vehicle.

6. A linkage component as set forth in claim 5 wherein said second end portion of said linkage component and said rod portion of said linkage component are formed from a single piece of sheet metal, said second end portion of said linkage component includes an internal thread convolution which engages an externally threaded member to connect the second end portion of said linkage component with the second portion of the vehicle.

* * * * *